United States Patent [19]

Krafka

[11] Patent Number: 4,642,997
[45] Date of Patent: Feb. 17, 1987

[54] PROCESS AND APPARATUS FOR POWER-AND AIR CONDITIONING-FRESH AIR GENERATION IN AIRCRAFT

[75] Inventor: Herfried Krafka, Toulouse, France

[73] Assignee: Deutsche Airbus GmbH, Munich, Fed. Rep. of Germany

[21] Appl. No.: 717,377

[22] Filed: Mar. 29, 1985

[30] Foreign Application Priority Data

Mar. 31, 1984 [DE] Fed. Rep. of Germany ....... 3412101

[51] Int. Cl.⁴ .............................................. F25B 9/00
[52] U.S. Cl. .......................................... 62/87; 62/402
[58] Field of Search ....................... 62/86, 87, 401, 402

[56] References Cited

U.S. PATENT DOCUMENTS

| 2,304,151 | 12/1942 | Crawford | 62/401 |
| 2,697,917 | 12/1954 | Mayer | 62/87 |
| 2,829,505 | 8/1958 | Oates, Jr. | 62/401 |
| 2,929,224 | 3/1960 | Pickard | 62/172 |
| 2,940,258 | 6/1960 | Lombard et al. | 62/401 |
| 3,052,106 | 9/1962 | Sampietro et al. | 62/87 |
| 3,247,676 | 4/1966 | Lode | 62/401 |
| 3,470,703 | 10/1969 | Wen | 62/86 |
| 3,688,770 | 9/1972 | O'Neill | 62/86 |
| 3,699,777 | 10/1972 | Rannenberg | 62/402 |
| 4,014,179 | 3/1977 | Iles et al. | 62/402 |
| 4,374,469 | 2/1983 | Rannenberg | 62/402 |

FOREIGN PATENT DOCUMENTS 1456146 4/1964 Fed. Rep. of Germany .

Primary Examiner—Ronald C. Capossela
Attorney, Agent, or Firm—Toren, McGeady & Goldberg

[57] ABSTRACT

A process of and a device for power- and air-conditioning fresh air generation in an aircraft, which are equipped with main power plants and an auxiliary power unit driving an air-conditioning compressor, both of which are supplied with air-conditioning exhaust air from the passenger- and/or pilot cabin and/or with exhaust air from the boundary layer suction for the purpose of economical operation.

23 Claims, 2 Drawing Figures

PROCESS AND APPARATUS FOR POWER- AND AIR CONDITIONING-FRESH AIR GENERATION IN AIRCRAFT

BACKGROUND OF THE INVENTION

The invention is directed to a process and a device for power- and air conditioning-fresh air generation in aircraft, which are equipped with main power plants and an auxiliary power unit driving an air conditioning compressor with an appropriate air intake, compressor, diffuser and an associated exhaust nozzle as well as a heat exchanger and which comprise a suction device for removing the boundary layer from aircraft wings.

The installation of an auxiliary power unit in the tail of aircraft for generation of electrical current and for the supply of air conditioned ambient air to the aircraft is known, whereby the auxiliary power unit assumes this task only during the periods, when the aircraft is on the ground during loading and unloading and during fueling and while the main power plants are not in operation. According to existing practice, the auxiliary power unit is shut down in flight and the main power units assume the task of power and fresh air supply.

From DE-OS No. 31 21 909 for instance an integrated auxiliary power and air conditioning unit has become known, which has a variable geometry compressor, which can be driven on the one hand by bleed air from the main power plant and on the other hand through a freewheeling clutch by the auxiliary power unit for power- and air conditioning-fresh air supply.

The device has the disadvantage that for its operation a high fuel consumption is required, because without additional power supply this is always proportional to the output, which the main power plants must generate for the required bleed air amount or the auxiliary power unit must supply as mechanical output for the pertinent supply functions of the aircraft. Apart from that the compressor stages of the main power plants are primarily optimized for the generation of forward thrust and not for the production of bleed air, whereby for this additional air mass the entire main power plant has to be designed to be larger. Over and above that the main power plants are very highly loaded by the removal of bleed air, particularly during the take-off phase and thus the flight safety of the aircraft is jeopardized.

SUMMARY OF THE INVENTION

It is the task of the invention to propose a process of and a device for the accomplishment of the process, with which the efficiency and the economy of the power- and air conditioning-fresh air supply of aircraft and their flight safety is improved.

BRIEF DESCRIPTION OF THE DRAWING

In the following the invention is described with particularity with the help of an embodiment example depicted in the drawing. It is shown on FIG. 1 a section through the device for the power and air conditioning fresh air generation in schematic presentation, FIG. 2 a section through the air conditioning air compressor.

DETAILED DESCRIPTION OF THE INVENTION

Figure 1:
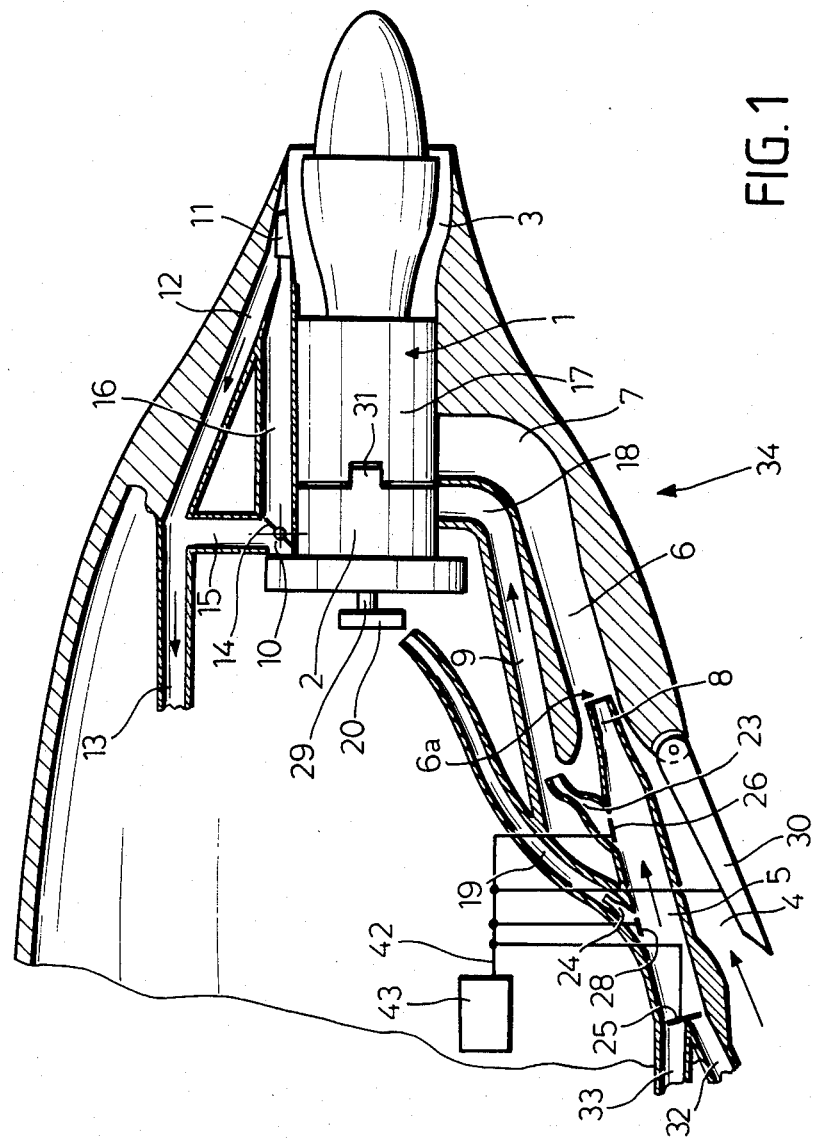

As can be seen in FIG. 1, a guidance tube 5 equipped with a nozzle 8 is arranged in the air intake 4, at whose other end a feed tube 32 for cabin exhaust air and a pipeline 33 for exhaust air from the boundary layer suction device, not shown here, from the wing surfaces of the aircraft, also not shown here, is provided. Through the guide tube 5 this exhaust air is accelerated by the nozzle 8 towards the mid-section of of the intake 4 and subsequently mixed together in the collection duct 6 with the fresh air flowing in through the air intake 4, whereby the pressure difference existing at the intake throat 6a or respectively at the nozzle outlet 8 increases the flow velocity. Following that the mixture of the exhaust air with the fresh air occurs in the subsequently arranged diffuser 7. This already heated as well as compressed air mixture thus rich in energy is led to the compressor or turbine 17 of the auxiliary power unit arranged in the airplane tail 34 for the purpose of its efficient operation. For the thus achievable fuel economy at the same power or for an increased power at the same fuel consumption, the auxiliary power unit is therefore constantly kept in operation during the aircraft operation on the ground as well as in the air. Simultaneously a portion of the fresh air from the air intake 4 is aspirated through a feed duct 9 by an air conditioning compressor 2 coupled with the compressor or turbine 17 through a clutch 31 and is compressed in the air conditioning compressor 2 for supply of fresh air for air conditioning.

The entire or only a portion of the exhaust air from the boundary layer suction—and particularly when the compressor or turbine 17 requires a portion of the exhaust air—can, through an additional nozzle 23 arranged at the guide tube 5, be supplied through the supply duct 9 to another diffuser 18 and possibly be mixed in same with the fresh air from the air intake 4 prior to its being compressed in the air conditioning compressor 2.

The air conditioning fresh air leaving the air conditioning compressor 2, whose compression also requires little compressor power because of the added boundary layer air rich in energy, is directed as required at 10 by means of a thermostatically controlled mixing valve 14 either for additional heating through a supply pipe 16 to the heat exchanger 11 or directly through a pipe 15 and a feed pipe 13 to the cabin not shown here. The air-conditioning air from the pipe 15 can together with the heated air conditioning air from the heat exchanger 11 according to the heat requirements be subsequently mixed at the crossing of the pipe 15 and a return pipe 12 and be further directed into the cabin.

The heat exchanger 11 is arranged at the wall of the exhaust nozzle 3 of the auxiliary power unit 1 for the absorption of heat from the exhaust gases.

In case of a particularly high output requirement of the air conditioning compressor 2, which in addition to supplying air conditioning air must also, for instance in a manner not shown here, generate electric power, a controlled portion or the entire amount of the exhaust air from the cabin and/or from the boundary layer suction can be directed by the guide tube 5 through a feed pipe 19 to a turbine 20 disengageably connected with the air conditioning compressor 2 through a clutch 29. The exhaust gases are exhausted through an exhaust pipe not shown here. The control of the amount of exhaust air, which is accelerated by means of an additional nozzle 24 at the feed pipe 5 to the turbine, is accomplished by means of a flap 28 arranged at said feed pipe.

The supply of exhaust air from the cabin and from the boundary layer suction can be also controlled separately or collectively by means of an additional flap 25 designed as a double barrier at the supply pipe 32 and the pipeline 33. Likewise, an additional flap 26 is arranged at the guide tube 5 for controlling the exhaust air to the air conditioning compressor 2.

A control connection 42 is provided between the flaps 25, 26, 28 and an intake flap 30 located at the air intake 4, whereby said control connection leads to a known and therefore not shown in detail control device 43, by means of which the respectively required mass of exhaust air and fresh air is controllable by the above-mentioned flaps in an interdependent manner.

Figure 2:
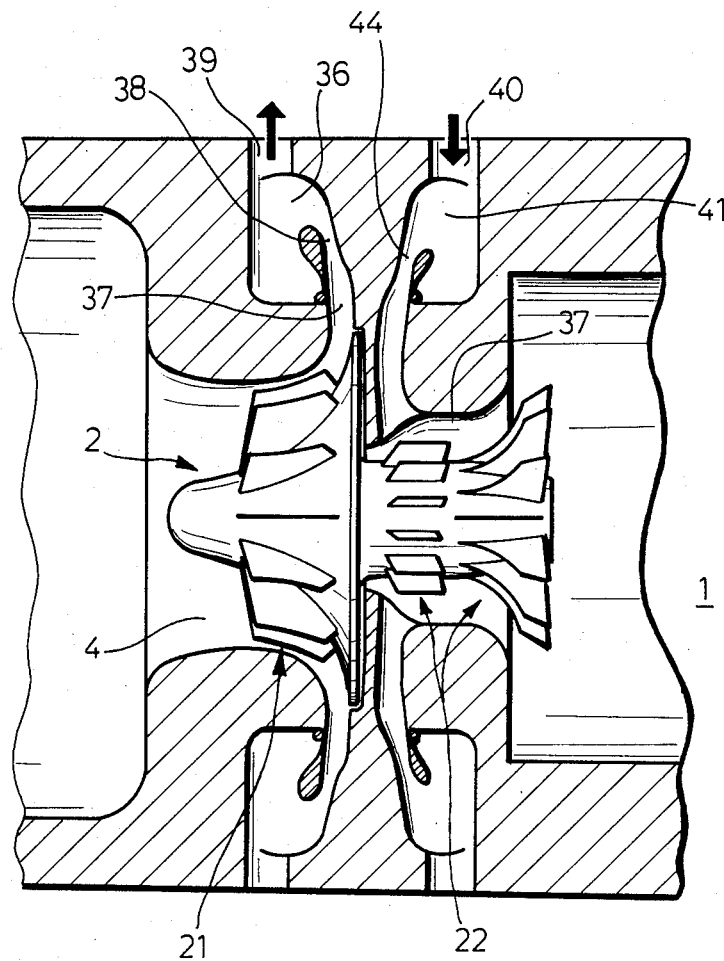

As can be seen from FIG. 2, an annular chamber 36 can be assigned to a first stage 21 of the air conditioning compressor 2, which on the one hand comprises a gap 38 for entry of fresh air from the stator duct 37 which has already been compressed by the air conditioning compressor 2 and on the other hand comprises an exit 39 for the outflow to the heat exchanger 11 or to the cabin. For the hereby required auxiliary or continuous drive of the air conditioning compressor 2, a further annular chamber 41 can be provided at said compressor with an entry 40 for the exhaust air flowing from the guide tube 5, which through an access 44 acts on the additional stages 22 of the air conditioning compressor 2, whereby it can be operated extremely economically in case of minor output requirements.

Instead of the air-conditioning compressor 2 configured as previously described, the compressor 17 of the auxiliary power unit 1 also designed in a like manner or of the main power plant not shown here—which like the first-mentioned one can be of centrifugal or axial construction—can be used, whose other stages 22 for power unit operation, however, must be supplied with an exhaust-fresh air mixture or only with fresh air.

The advantage of the invention is particularly justified in that, for the purpose of a considerable fuel economy or for a considerable power increase at equal consumption, the air conditioning exhaust air from the passenger and/or pilot cabin is utilized as energy-rich combustion air for the efficient operation of the auxiliary power unit. This exhaust air has only lost a small portion of its oxygen content in the cabin, has however still a large heat content and, because of the general simulation requirement of creating at great flight altitudes by air pressure a relatively low atmospheric altitude in the cabin for the passengers, it has a high quantity of compression energy. This exhaust air rich in energy can therefore be utilized for driving a turbine coupled with the air conditioning compressor for a particularly high output requirement, as well as for the supply of the compressor of the auxiliary power unit and for the intermittent or continuous drive of the air conditioning compressor by means of its stages provided therefor, whereby in the last case a particularly economic operation of this unit in case of a small output requirement is possible.

In addition, or instead of cabin exhaust air the likewise very power-rich exhaust air from the boundary layer suction can be drawn upon for operating the auxiliary power unit or the turbine and/or for economic generation of air conditioning fresh air in the air conditioning compressor or in the device for boundary layer suction, because this exhaust air has, in addition to a high compression energy, also a high oxygen content. Moreover, an optimum adaptation of the device to the operational requirements of an efficient and economical power- and air conditioning air generation is always possible by means of the control or regulation of the respectively required amount of exhaust air and fresh air through flaps, which are controllable by a control device, as well as by declutching of non-required rotating accessory components, as for instance the turbine. Because of the high achievable efficiency in this manner of operation, it is possible to do without bleed air for the main power plants for driving the air conditioning compressors. Thus, these are considerably unburdened with a consequent improvement of flight safety and additionally can be designed to be lighter for a lower output.

I claim:

1. A process of supplying power and air-conditioned fresh air in an aircraft comprising means forming an aircraft tail section, an auxiliary power unit within the tail section, an air-conditioning compressor arranged to be driven by said auxiliary power unit, an air intake for fresh air connected to the air-conditioning compressor, said auxiliary power unit including a turbine, a diffuser connected to the auxiliary power unit for supplying air thereto, an exhaust nozzle connected to the auxiliary power unit for discharging exhaust out of the tail section, a heat exchanger in heat transfer relation with the exhaust nozzle, means for supplying boundary layer suction air from the aircraft wings to at least the diffuser, and comprising the steps of directing exhaust air from at least one of the aircraft cabin and the boundary layer suction to the air intake and mixing the exhaust air from at least one of the aircraft cabin and the boundary layer with fresh air from the air intake at a location upstream from the auxiliary power unit, aspirating a part of the fresh air from the air intake and supplying the aspirated air to the air-conditioning compressor and driving the air-conditioning compressor by means of the auxiliary power unit, supplying at least a part of the air from the boundary layer suction and mixing such air with fresh air from the air intake and compressing the air mixture in the air-conditioning compressor, withdrawing the air mixture from the air-conditioning compressor and conveying it to the aircraft cabin, providing the air-conditioning compressor with a first stage and further stages, supplying compressed fresh air from the air intake to one of the first stage and the turbine of the auxiliary power unit after passage through the further stages, and supplying the further stages of the air-conditioning compressor with one of exhaust air and a mixture of exhaust air and fresh air.

2. A process, as set forth in claim 1, including selectively directing the air-conditioning fresh air from the air-conditioning compressor to the heat exchanger and then to the aircraft cabin.

3. A process, as set forth in claim 1, wherein connecting a turbine to the air-conditioning compressor and directing at least a portion of the exhaust air to the turbine for generating electric power.

4. A process, as set forth in claim 3, selectively coupling the air-conditioning compressor and the turbine.

5. A process, as set forth in claim 1, wherein accelerating the exhaust air directed to at least one of the auxiliary power unit and the air-conditioning compressor.

6. A process, as set forth in claim 1, for selectively directing the flow of the exhaust air from the aircraft cabin and the boundary layer suction.

7. A process, as set forth in claim 1, wherein selectively controlling the outlet flow from the air-conditioning compressor for directing the flow to one of the aircraft cabin and the heat exchanger.

8. A process, as set forth in claim 1, wherein controlling the flow of fresh air into the air intake.

9. A process, as set forth in claim 8, wherein selectively controlling the flow of exhaust air from the aircraft cabin and the boundary layer suction into the auxiliary power unit and the air-conditioning compressor.

10. A process, as set forth in claim 1, selectively coupling the air-conditioning compressor to the turbine of the auxiliary power unit.

11. A device for supplying power and air-conditioned fresh air in an aircraft, comprising means forming an aircraft tail section having an outlet end, an auxiliary power unit positioned within said tail section, an air-conditioning compressor located within said tail section and arranged to be driven by said auxiliary power unit with said auxiliary power unit being located between said air-conditioning compressor and the outlet end of said tail section, an air intake located in said tail section spaced from the outlet end thereof and having a first end for receiving fresh air from the exterior of said tail section and a second end located at said auxiliary power unit, said auxiliary power unit including a turbine, the second end of said air intake forms a diffuser connected to said auxiliary power unit for supplying air thereto, an exhaust nozzle at the outlet end of said tail section and connected to said auxiliary power unit for discharging exhaust from the tail section, a heat exchanger located within said tail section in heat transfer relation with said exhaust nozzle, means for supplying boundary layer suction air from the aircraft wing to said air intake, a guide tube located within said tail section and having a first end for receiving exhaust air from the aircraft cabin and exhaust air from the boundary layer suction and a second end opening into said air intake adjacent the first end thereof, and the second end of said air intake forms a diffuser for mixing the air within the air intake before it is introduced into said auxiliary power unit, a supply duct within said tail section having a first end in communication with said air intake and a second end in communication with said air-conditioning compressor for aspirating air from the air intake and conducting the aspirated air to the air-conditioning compressor, the first end of said supply duct arranged to receive exhaust air from said guide tube, and the second end of said supply duct forming a diffuser for mixing the air flowing through the supply duct before it enters the air-conditioning compressor, conduit means connected to said air-conditioning compressor for receiving outlet flow therefrom for conveying such outlet flow to the aircraft cabin, said air-conditioning compressor having a first stage and further stages, said turbine of said auxiliary power unit comprising a first stage and further stages, and said first stage and further stages of at least one of said air-conditioning compressor and said turbine of said auxiliary power unit arranged to receive air for flow through said means from said air-conditioning compressor and said turbine of the auxiliary power unit for use in air-conditioning the aircraft.

12. A device, as set forth in claim 11, wherein said means for conveying air from the air-conditioning compressor to the aircraft cabin includes a flow passage for directing air from the air-conditioning compressor to said heat exchanger and another passageway for flowing the air from the heat exchanger to the aircraft cabin.

13. A device, as set forth in claim 12, including a theremostatically controlled valve for selectively regulating the outlet flow from said air-conditioning compressor into said means for flowing the air-conditioned air into the aircraft cabin.

14. A device, as set forth in claim 11, wherein a second turbine is connected to said air-conditioning compressor, and a supply pipe connected to said guide tube at one end and arranged at the opposite end to direct exhaust air to said second turbine.

15. A device, as set forth in claim 14, wherein a clutch selectively couples said second turbine to said air-conditioning compressor.

16. A device, as set forth in claim 11, wherein nozzles are formed on said guide tube for accelerating the flow of exhaust air therefrom into said air intake and said supply duct.

17. A device, as set forth in claim 11, wherein controlled flaps are located at the first end of said guide tube and at openings from said guide tube for controlling the flow into and out of said guide tube.

18. A device, as set forth in claim 11, wherein said heat exchanger is mounted at least in part in said exhaust nozzle.

19. A device, as set forth in claim 11, wherein a controllable intake flap is located at the first end of said air intake and a control device in engagement with said controllable intake flap.

20. A device, as set forth in claim 11, including a second clutch for coupling said air-conditioning compressor and said turbine of said auxiliary power unit.

21. A device, as set forth in claim 11, wherein an annular chamber is connected to the first stage of said air-conditioning compressor, a stator duct located about said further stages of said air-conditioning compressor, a gap for conducting the flow from the stator duct into said annular chamber and said annular chamber having an outlet duct for directing flow to the aircraft cabin.

22. A device, as set forth in claim 21, comprising a second annular chamber in communication with the further stages of said air-conditioning compressor, an entry connected to said annular chamber and to said guide tube and an access duct connecting said second annular chamber to said further stages.

23. A device, as set forth in claim 21, wherein an annular chamber is connected to said first stage of said turbine of the auxiliary power unit, an outlet from said annular chamber, a connecting duct between said annular chamber and said first stage, and a second annular chamber in communication with said further stages of said turbine of said auxiliary power unit, an inlet to said second annular chamber for introducing flow from said air intake, and an access duct connecting said second annular chamber and said further stages.

* * * * *